United States Patent
Park et al.

(10) Patent No.: US 9,589,725 B2
(45) Date of Patent: *Mar. 7, 2017

(54) MULTILAYER CERAMIC CAPACITOR, MOUNTING CIRCUIT BOARD THEREOF, AND MANUFACTURING METHOD OF THE SAME

(71) Applicant: SAMSUNG ELECTRO-MECHANICS CO., LTD., Suwon, Gyunggi-do (KR)

(72) Inventors: Sang Soo Park, Gyunggi-do (KR); Heung Kil Park, Gyunggi-do (KR)

(73) Assignee: SAMSUNG ELECTRO-MECHANICS CO., LTD., Suwon-Gyeonggi-Do (KR)

(*) Notice: Subject to any disclaimer, the term of this patent is extended or adjusted under 35 U.S.C. 154(b) by 468 days.

This patent is subject to a terminal disclaimer.

(21) Appl. No.: 14/067,543

(22) Filed: Oct. 30, 2013

(65) Prior Publication Data
US 2015/0008025 A1 Jan. 8, 2015

(30) Foreign Application Priority Data
Jul. 5, 2013 (KR) .................. 10-2013-0079098

(51) Int. Cl.
*H01G 4/30* (2006.01)
*H01G 2/06* (2006.01)
*H01G 4/232* (2006.01)

(52) U.S. Cl.
CPC ............. *H01G 2/065* (2013.01); *H01G 4/232* (2013.01); *H01G 4/30* (2013.01); *Y10T 29/435* (2015.01)

(58) Field of Classification Search
CPC H01G 4/30; H01G 4/12; H01G 4/228; H01G 4/232; H01G 4/008; H01G 4/33
(Continued)

(56) References Cited

U.S. PATENT DOCUMENTS 6,377,439 B1 4/2002 Sekidou et al.
6,473,292 B1 * 10/2002 Yoshida .................. H01G 4/30
361/301.4
(Continued)

FOREIGN PATENT DOCUMENTS

JP 6-215978 A 8/1994
JP 8-8188 B2 1/1996
(Continued)

OTHER PUBLICATIONS

Korean Office Action issued in Korean Application No. 10-203-0079098 dated Jun. 23, 2014, with English translation.
(Continued)

*Primary Examiner* — Nguyen Ha
(74) *Attorney, Agent, or Firm* — McDermott Will & Emery LLP

(57) ABSTRACT

There is provided a multilayer ceramic capacitor including, a ceramic body including a plurality of dielectric layers, a plurality of first and second internal electrodes disposed in the ceramic body to be alternately exposed through the double side surfaces facing each other in a width direction, having the dielectric layers therebetween, and first and second external electrodes formed on the surfaces of the ceramic body in the width and thickness directions and electrically connected to the first and second internal electrodes, wherein when a length of the ceramic body is defined as L and a width of the ceramic body is defined as W, a ratio L/W of the length L to the width W of the ceramic body satisfies $1.39 \leq L/W \leq 2.12$.

12 Claims, 3 Drawing Sheets

(58) Field of Classification Search
USPC .... 361/301.4, 303–305, 306.1, 306.3, 321.1, 361/321.2
See application file for complete search history.

(56) References Cited

U.S. PATENT DOCUMENTS

| | | | |
|---|---|---|---|
| 7,414,857 B2 † | 8/2008 | Ritter | |
| 8,238,116 B2 † | 8/2012 | Eggerding | |
| 9,362,054 B2 * | 6/2016 | Park | H01G 4/30 |
| 2006/0126264 A1 | 6/2006 | Yoshii et al. | |
| 2011/0114378 A1 | 5/2011 | Yoshii et al. | |
| 2012/0152604 A1 * | 6/2012 | Ahn | H01G 2/065 174/260 |
| 2012/0300361 A1 | 11/2012 | Togashi | |
| 2013/0106560 A1 | 5/2013 | Zenzai et al. | |
| 2014/0166351 A1 * | 6/2014 | Lee | H01G 2/06 174/258 |

FOREIGN PATENT DOCUMENTS

| | | |
|---|---|---|
| JP | 11-186092 A | 7/1999 |
| JP | 2001-35738 A | 2/2001 |
| JP | 2004-342846 A | 12/2004 |
| JP | 2006-173270 A | 6/2006 |
| JP | 2007-194312 A | 8/2007 |
| JP | 2008-187037 A | 8/2008 |
| JP | 2011-54989 A | 3/2011 |
| JP | 2011-108827 A | 6/2011 |
| JP | 2012-248581 A | 12/2012 |
| JP | 2013-118358 A | 6/2013 |
| JP | 2014-36169 A | 2/2014 |
| KR | 20100100722 A | 9/2010 |

OTHER PUBLICATIONS

Notice of Office Action Japanese Patent Application No. 2013-207929 dated May 12, 2015 with English translation.
Japanese Decision of Final Rejection issued on Mar. 8, 2016 in Japanese Patent Application No. 2013-207929, with English Translation.
Yukio Sakabe et al.; High Frequency Performance of Multilayer Ceramic Capacitors, Document No. 0569-5503/95/0000, pp. 234-240, 1995 IEEE.†
Joseph M. Hock et al.; TecForum TF-MP2, Inductance of Bypass Capcitors; How to Define, How to Measure, How to Stimulate, DesignCon East 2005.†

\* cited by examiner
† cited by third party

A-A'

MULTILAYER CERAMIC CAPACITOR, MOUNTING CIRCUIT BOARD THEREOF, AND MANUFACTURING METHOD OF THE SAME

CROSS-REFERENCE TO RELATED APPLICATIONS

This application claims the priority of Korean Patent Application No. 10-2013-0079098 filed on Jul. 5, 2013, in the Korean Intellectual Property Office, the disclosure of which is incorporated herein by reference.

BACKGROUND OF THE INVENTION

Field of the Invention

The present invention relates to a multilayer ceramic capacitor, a mounting circuit board thereof, and a manufacturing method of the same.

Description of the Related Art

A multilayer ceramic capacitor (MLCC), a multilayer chip electronic component, is capable of being used in various electronic devices, due to advantages such as a small size, high capacitance, ease of mounting, or the like.

For example, the multilayer ceramic capacitor is used in a chip-shaped condenser mounted on circuit boards of various electronic products including display devices such as liquid crystal displays (LCDs), plasma display panels (PDPs) and the like, as well as including computers, smartphones, mobile phones, and the like, to serve to charge and discharge electricity therein.

The multilayer ceramic capacitor may have a structure in which a plurality of dielectric layers and internal electrodes having different polarities are alternately stacked while being interposed between the dielectric layers.

In this case, since the dielectric layers have piezoelectric properties, when a direct current (DC) voltage or an alternating current (AC) voltage is applied to the multilayer ceramic capacitor, a piezoelectric phenomenon may be generated between the internal electrodes, such that a volume of a ceramic body is expanded and contracted according to a frequency, thereby generating periodic vibrations.

The vibrations are transmitted to a circuit board through external electrodes and a solder connecting the external electrodes of the multilayer ceramic capacitor to the circuit board, such that the entire circuit board becomes a sound reflective surface to generate a vibration sound to be a noise.

In this case, the solder connecting the external electrodes and the circuit board is inclined from both side surfaces and both end surfaces of the ceramic body towards surfaces of the external electrodes at a predetermined height, wherein as a volume and the height of the solder become increased, the vibrations of the multilayer ceramic capacitor are easily transmitted to the circuit board, thereby generating a significant amount of vibration sound.

The vibration sound may be in an audible frequency region of 20 to 20,000 Hz, causing listener discomfort, and the vibration sound causing listener discomfort refers to an acoustic noise.

Recently, in electronic devices, since acoustic noise generated in the multilayer ceramic capacitor as described above may be significant due to a decreased noise of components, research into a technology of effectively decreasing the acoustic noise generated in the multilayer ceramic capacitor has been required.

Meanwhile, a method of allowing a length or a width of the external electrode to be smaller than a length or a width of the ceramic body in order to decrease the acoustic noise has been partially disclosed.

However, in this case, since the length of the external electrode is short, equivalent series inductance (ESL) of the multilayer ceramic capacitor may be relatively increased.

In the case in which the ESL of the multilayer ceramic capacitor is increased, high frequency properties of a product are also deteriorated, such that at the time of mounting the multilayer ceramic capacitor on the circuit board, or the like, the acoustic noise and a ripple voltage may be insufficiently removed.

Patent Document 1 discloses a multilayer ceramic capacitor, but fails to disclose that an increase in ESL of the multilayer ceramic capacitor is suppressed.

RELATED ART DOCUMENT (Patent Document 1) Korean Patent Laid-Open Publication No. KR 10-2010-0100722

SUMMARY OF THE INVENTION

An aspect of the present invention provides a multilayer ceramic capacitor capable of effectively decreasing acoustic noise and equivalent series inductance (ESL) occurring when vibrations generated in the multilayer ceramic capacitor by a piezoelectric phenomenon are transmitted to a circuit board through external electrodes and a solder.

According to an aspect of the present invention, there is provided a multilayer ceramic capacitor including: a ceramic body including a plurality of dielectric layers and having first and second main surfaces facing each other in a thickness direction, third and fourth end surfaces facing each other in a length direction, and fifth and sixth side surfaces facing each other in a width direction; a plurality of first and second internal electrodes disposed in the ceramic body to be alternately exposed through the fifth and sixth side surfaces, having the dielectric layers therebetween; and first and second external electrodes formed on the surfaces of the ceramic body in the width and thickness directions and electrically connected to the first and second internal electrodes, wherein when a length of the ceramic body is defined as W and a width of the ceramic body is defined as L, a ratio L/W of the length L to the width W of the ceramic body may satisfy $1.39 \leq L/W \leq 2.12$.

When a length of the first or second external electrode is defined as B and a thickness of a lower margin part of the ceramic body is defined as Cv, a ratio B/Cv of the length of the first or second external electrode to the thickness of the lower margin part of the ceramic body may satisfy $8.05 \leq B/Cv \leq 10.56$.

The length of each of the first and second external electrodes may be smaller than the length of the ceramic body.

The ceramic body may have an upper cover layer and a lower cover layer formed on an upper portion and a lower portion of an active layer having the first and second internal electrodes disposed therein, respectively.

The lower cover layer may have a thickness greater than that of the upper cover layer.

According to another aspect of the present invention, there is provided a manufacturing method of a multilayer ceramic capacitor, the manufacturing method including: preparing a stacked body by stacking and pressing a plurality of ceramic sheets having first and second internal electrodes formed therein to face each other, with the ceramic sheets interposed therebetween, the first and second internal electrodes being formed so as to be alternately exposed in a width direction; preparing a ceramic body by cutting the stacked body into portions, each corresponding one capacitor, and firing the portions to form ceramic bodies having first and second main surfaces facing each other in a thickness direction, third and fourth end surfaces facing each other in a length direction, and fifth and sixth side surfaces facing each other in the width direction to which the first and second internal electrodes are exposed, respectively; and forming first and second external electrodes formed on the surfaces of the ceramic body in the width and thickness directions to be electrically connected to the first and second internal electrodes, wherein when a length of the ceramic body is defined as W and a width of the ceramic body is defined as L, a ratio L/W of the length L to the width W of the ceramic body satisfies $1.39 \leq L/W \leq 2.12$.

According to another aspect of the present invention, there is provided a mounting circuit board of a multilayer ceramic capacitor, the mounting circuit board including: a circuit board having first and second electrode pads disposed thereon; and at least one multilayer ceramic capacitor mounted on the circuit board, wherein the multilayer ceramic capacitor includes: a ceramic body including a plurality of dielectric layers and having first and second main surfaces facing each other in a thickness direction, third and fourth end surfaces facing each other in a length direction, and fifth and sixth side surfaces facing each other in a width direction; a plurality of first and second internal electrodes disposed in the ceramic body be alternately exposed through the fifth and sixth side surfaces, having the dielectric layers interposed therebetween; and first and second external electrodes formed on the surfaces of the ceramic body in the width and thickness, electrically connected to the first and second internal electrodes, and connected to the first and second electrode pads, and when a length of the ceramic body is defined as W and a width of the ceramic body is defined as L, a ratio L/W of the length L to the width W of the ceramic body satisfies $1.39 \leq L/W \leq 2.12$.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
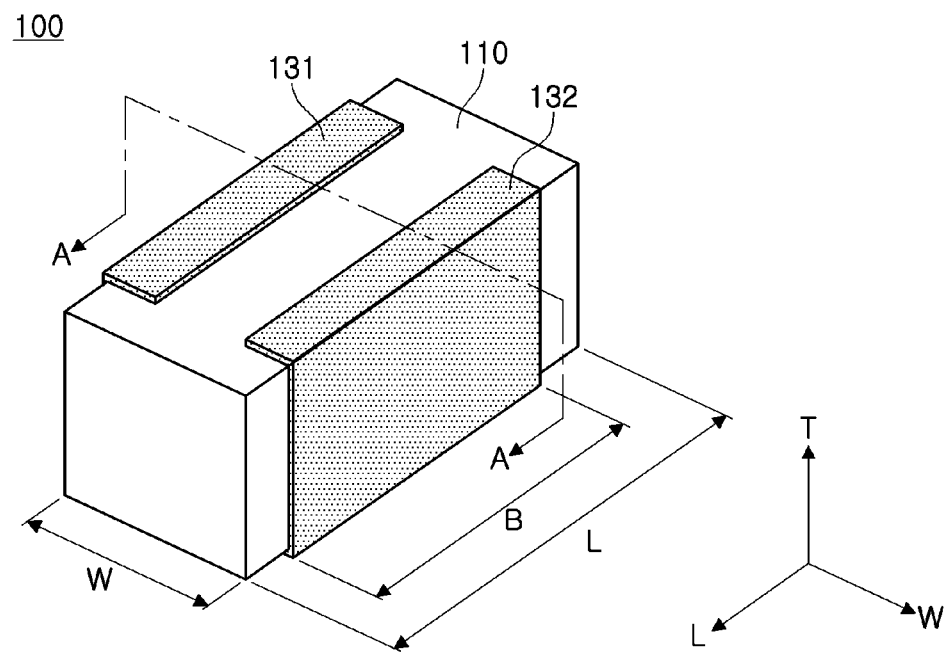
FIG. 1 is a perspective view schematically showing a multilayer ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Multilayer Ceramic Capacitor

Figure 2:
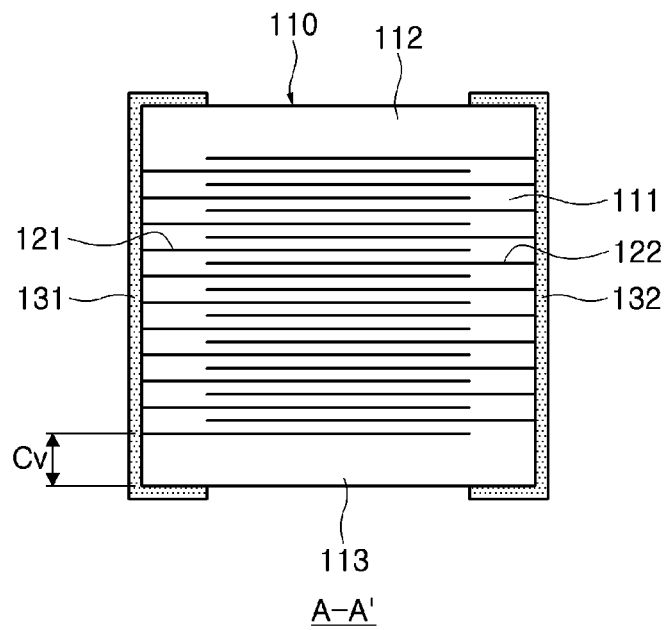
FIG. 2 is a cross-sectional view taken along the line A-A' of FIG. 1.

FIG. 1 is a perspective view schematically showing a multilayer ceramic capacitor according to an embodiment of the present invention, and FIG. 2 is a cross-sectional view taken along the line A-A' of FIG. 1.

Referring to FIGS. 1 and 2, a multilayer ceramic capacitor 100 according to the present embodiment may include a ceramic body 110 including a plurality of dielectric layers 111 stacked in a thickness direction thereof, a plurality of first and second internal electrodes 121 and 122, and first and second external electrodes 131 and 132 electrically connected to the first and second internal electrodes 121 and 122, respectively.

The ceramic body 110 may be formed by stacking and then firing the plurality of dielectric layers 111, wherein boundaries between adjacent dielectric layers 111 may be integrated such that they may not be readily discernible.

The ceramic body 110 may have a hexahedral shape. When directions of a hexahedron are defined in order to clearly describe embodiments of the present invention, L, W, and T shown in the drawings indicate length, width, and thickness directions, respectively.

In the present embodiment, surfaces of the ceramic body 110 facing each other in the thickness direction, that is, a direction in which the dielectric layers 111 of the ceramic body 110 are stacked, may be defined as first and second main surfaces, surfaces connecting the first and second main surfaces and facing each other in the length direction may be defined as third and fourth end surfaces, and surfaces facing each other in the width direction may be defined as fifth and sixth side surfaces.

In this case, when a length of the ceramic body 110 is defined as L and a width of the ceramic body 110 is defined as W, a ratio L/W of the length L to the width W of the ceramic body 110 may satisfy $1.39 \leq L/W \leq 2.12$.

The dielectric layer 111 may include a ceramic material having a high dielectric constant, and for example, a barium titanate ($BaTiO_3$)-based ceramic powder, or the like, but the present invention is not limited thereto as long as sufficient capacitance is obtained thereby.

Furthermore, the dielectric layers 111 may include a ceramic powder and if necessary, further include various types of ceramic additives such as a transition metal oxide or transition metal carbide, rare earth elements, and magnesium (Mg) or aluminum (Al), an organic solvent, a plasticizer, a binder and a dispersant, along with the ceramic powder.

The first and second internal electrodes 121 and 122, which are electrodes having different polarities, may be stacked on at least one surface of a ceramic sheet forming the dielectric layer 111, and may be disposed in the ceramic body 100 so as to be alternately exposed through the fifth and sixth side surfaces, having the dielectric layer 111 therebetween.

In this case, the first and second internal electrodes 121 and 122 may be electrically insulated from each other by the dielectric layers 111 disposed therebetween, and capacitance of the multilayer ceramic capacitor 100 may be proportional to an area of the first and second internal electrodes 121 and 122 overlapped with each other in the stacking direction of the dielectric layers 111.

In addition, the first and second internal electrodes 121 and 122 may be formed of a conductive metal, for example, one of silver (Ag), palladium (Pd), platinum (Pt), nickel (Ni), and copper (Cu), or alloys thereof, and the like, but the present invention is not limited thereto.

The first and second external electrodes 131 and 132 may be formed to cover portions of the first and second internal electrodes 121 and 122 exposed to the fifth and sixth side surfaces of the ceramic body 110 to be electrically connected to the first and second internal electrodes 121 and 122, respectively.

The first and second external electrodes 131 and 132 may be extended from the fifth and sixth side surfaces to the first and second main surfaces of the ceramic body 110 in a cross-section of the ceramic body 110 in a width-thickness direction.

In addition, the first and second external electrodes 131 and 132 may be formed of a conductive metal, for example, one of silver (Ag), palladium (Pd), platinum (Pt), nickel (Ni), and copper (Cu), or alloys thereof, and the like, but the present invention is not limited thereto.

Further, each of the first and second external electrodes 131 and 132 may have a length B smaller than the length L of the ceramic body 110.

In this case, when a length of the first external electrode 131 or the second external electrode 132 is defined as B and a thickness of a lower margin part of the ceramic body 110 is defined as Cv, a ratio B/Cv of the length of the first external electrode 131 or the second external electrode 132 to the thickness of the lower margin part of the ceramic body 110 may satisfy $8.05 \leq B/Cv \leq 10.56$.

Meanwhile, first and second plating layers (not shown) may be further formed on surfaces of the first and second external electrodes 131 and 132, as needed.

The first and second plating layers may include a nickel (Ni) plating layer formed on the first and second external electrodes 131 and 132 and a tin (Sn) plating layer formed on the nickel plating layer.

The first and second plating layers are provided to increase adhesion strength between the multilayer ceramic capacitor 100 and a circuit board at the time of mounting the multilayer ceramic capacitor 100 on the circuit board, or the like, by solder, or the like. The plating may be performed by a method known in the art, and lead-free plating may be preferred in consideration of eco-friendly factors, but the present invention is not limited thereto.

Manufacturing Method of Multilayer Ceramic Capacitor

Hereinafter, a manufacturing method of the multilayer ceramic capacitor according to the embodiment of the present invention will be described.

First, a plurality of ceramic sheets are prepared. The ceramic sheets are provided to form the dielectric layers 111 of the ceramic body 110 and may be manufactured by mixing a ceramic powder, a polymer, a solvent, and the like to prepare a slurry, and then applying and drying the slurry onto carrier films to form the slurry in sheet shapes each having a thickness of several μm by a doctor blade method or the like.

Next, the first and second internal electrodes 121 and 122 are formed by printing a conductive paste at a predetermined thickness on at least one surface of each ceramic sheet.

Here, the first and second internal electrodes 121 and 122 are exposed through both side surfaces of the ceramic sheet in the width direction, respectively.

The conductive paste may be formed of one of silver (Ag), palladium (Pd), platinum (Pt), nickel (Ni), and copper (Cu), or alloys thereof, and the like, but the present invention is not limited thereto.

Methods of printing the conductive paste may include a screen printing method, a gravure printing method, and the like, but the present invention is not limited thereto.

Next, a stacked body may be prepared by stacking and pressing the plurality of ceramic sheets in the thickness direction, the plurality of ceramic sheets having the first and second internal electrodes 121 and 122 formed therein to face each other, with the ceramic sheets interposed therebetween.

Then, the stacked body is cut into portions, each corresponding to one capacitor chip, and then the portions are fired at a high temperature to prepare the ceramic bodies 110 each having first and second main surfaces facing each other in a thickness direction, third and fourth end surfaces facing each other in a length direction, and fifth and sixth side surfaces facing each other in a width direction and having the first and second internal electrodes 121 and 122 alternately exposed thereto.

In this case, when the length of the ceramic body 110 is defined as L and the width of the ceramic body 110 is defined as W, a ratio L/W of the length L to the width W of the ceramic body 110 may satisfy $1.39 \leq L/W \leq 2.12$.

Next, the first and second external electrodes 131 and 132 are formed on the surfaces of the ceramic body 110 in the width and thickness directions by printing the conductive paste at a predetermined thickness or dipping the ceramic body into the conductive paste to thereby be electrically connected to the exposed portions of the first and second internal electrodes 121 and 122.

The first and second external electrodes 131 and 132 may be extended from the fifth and sixth side surfaces to the first and second main surfaces.

The conductive paste may be formed of one of silver (Ag), palladium (Pd), platinum (Pt), nickel (Ni), and copper (Cu), or alloys thereof, and the like, but the present invention is not limited thereto.

In this case, when the length of the first external electrode 131 or the second external electrode 132 is defined as B and the thickness of the lower margin part of the ceramic body 110 is defined as Cv, the ratio B/Cv of the length of the first external electrode 131 or the second external electrode 132 to the thickness of the lower margin part of the ceramic body 110 may satisfy $8.05 \leq B/Cv \leq 10.56$.

In addition, the first or second external electrode 131 or 132 may have the length B smaller than the length L of the ceramic body 110, as needed.

Meanwhile, after forming the first and second external electrodes 131 and 132, a plating process such as an electroplating process may be performed on the surfaces of the first and second external electrodes 131 and 132 to form the first and second plating layers.

Examples of materials used in the plating process may include nickel or tin, a nickel-tin-alloy, and the like, but the present invention is not limited thereto.

In addition, the first and second plating layers may have a two-layer structure by sequentially stacking a nickel plating layer and a tin plating layer on the surfaces of the first and second external electrodes 131 and 132, as needed.

Mounting Circuit Board of Multilayer Ceramic Capacitor

Figure 4:
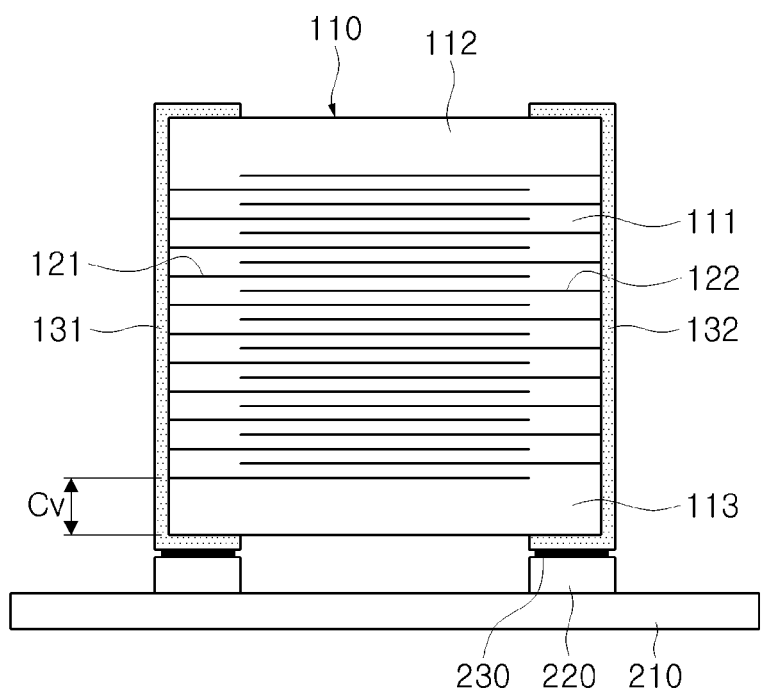
FIG. 4 is a side cross-sectional view schematically showing a mounting circuit board of a multilayer ceramic capacitor according to an embodiment of the present invention.

FIG. 4 is a side cross-sectional view schematically showing a mounting circuit board of a multilayer ceramic capacitor according to an embodiment of the present invention.

Referring to FIG. 4, the mounting circuit board of the multilayer ceramic capacitor 100 according to the present embodiment may include a circuit board 210 having the multilayer ceramic capacitor 100 mounted thereon, and first and second electrode pads 220 formed on the circuit board 210 to be spaced apart from each other.

In this case, the multilayer ceramic capacitor 100 may be electrically connected to the circuit board 210 by a solder 230 while the first and second external electrodes 131 and 132 are positioned on the first and second electrode pads 220 to contact therewith, respectively.

In the multilayer ceramic capacitor 100 according to the present embodiment, the first and second internal electrodes 121 and 122 are exposed in the width direction of the ceramic body 110, such that acoustic noise may be increased as compared to the case in which the first and second internal electrodes 121 and 122 are exposed in the length direction of the ceramic body 110.

Figure 3:
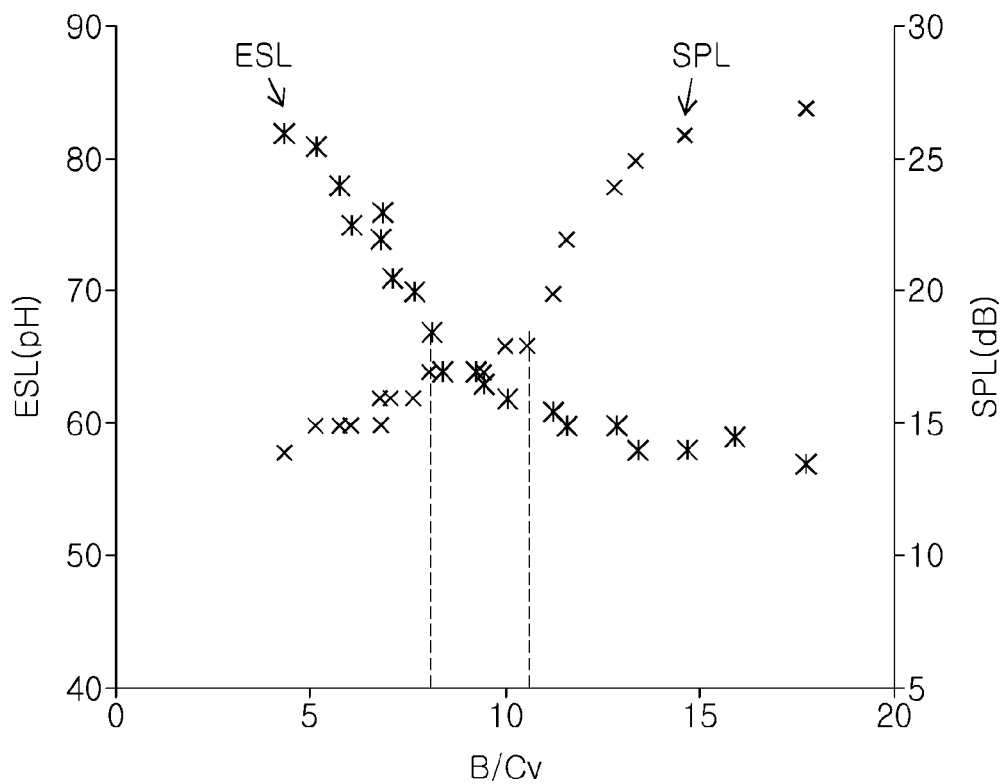
FIG. 3 is a graph showing changes in sound pressure level (SPL) and ESL according to a ratio (B/Cv) of a length L of an external electrode to a thickness of a lower margin part of a ceramic body in the multilayer ceramic capacitor according to the embodiment of the present invention.

The following Table 1 shows a sound pressure level (SPL) and equivalent series inductance (ESL) according to the ratio (B/Cv) of the length of the external electrode to the thickness of the lower margin part of the ceramic body in the multilayer ceramic capacitor according to the present embodiment, and FIG. 3 is a graph showing changes in sound pressure level (SPL) and ESL according to the ratio (B/Cv) of the length L of the external electrode to the thickness of the lower margin part of the ceramic body in the multilayer ceramic capacitor according to the embodiment of the present invention.

TABLE 1

| B | Cv | B/Cv | SPL(dB) | ESL(pH) |
|---|----|------|---------|---------|
| 0.6 | 0.06 | 10.00 | 18 | 62 |
| 0.8 | 0.06 | 13.33 | 25 | 58 |
| 0.95 | 0.06 | 15.83 | 33 | 59 |
| 0.6 | 0.085 | 7.06 | 16 | 71 |
| 0.8 | 0.085 | 9.41 | 17 | 63 |
| 0.95 | 0.085 | 11.18 | 20 | 61 |
| 0.6 | 0.118 | 5.08 | 15 | 81 |
| 0.8 | 0.118 | 6.78 | 15 | 74 |
| 0.95 | 0.118 | 8.05 | 17 | 67 |
| 0.6 | 0.14 | 4.29 | 14 | 82 |
| 0.8 | 0.14 | 5.71 | 15 | 78 |
| 0.95 | 0.14 | 6.79 | 16 | 76 |
| 0.75 | 0.065 | 11.54 | 22 | 60 |
| 0.95 | 0.065 | 14.62 | 26 | 58 |
| 1.15 | 0.065 | 17.69 | 27 | 57 |
| 0.75 | 0.09 | 8.33 | 17 | 64 |
| 0.95 | 0.09 | 10.56 | 18 | 61 |
| 1.15 | 0.09 | 12.78 | 24 | 60 |
| 0.75 | 0.125 | 6.00 | 15 | 75 |
| 0.95 | 0.125 | 7.60 | 16 | 70 |
| 1.15 | 0.125 | 9.20 | 17 | 64 |

Referring to FIG. 3 and Table 1 above, when the length of the ceramic body 110 is defined as L and the width of the ceramic body 110 is defined as W, in the case in which the ratio L/W of the length L to the width W of the ceramic body 110 satisfies 1.39≤L/W≤2.12, in the present embodiment, acoustic noise occurring due to vibrations being generated in the multilayer ceramic capacitor 100 by a piezoelectric phenomenon and being transmitted to the circuit board 210 through the first and second external electrodes 131 and 132 and the solder 230 may be decreased, thereby enabling a lowering of noise. In addition, when the length of the first external electrode 131 or the second external electrode 132 is defined as B and the thickness of the lower margin part of the ceramic body 110 is defined as Cv, and in the case in which the ratio B/Cv of the length of the first external electrode 131 or the second external electrode 132 to the thickness of the lower margin part of the ceramic body 110 satisfies 8.05≤B/Cv≤10.56, an increase in the equivalent series inductance (ESL) of the multilayer ceramic capacitor may be suppressed to prevent high frequency properties from being deteriorated.

The lowering of high frequency properties may be prevented, such that the acoustic noise and a ripple voltage of the mounting circuit board of the multilayer ceramic capacitor 110 may be effectively removed.

Modified Example

Figure 5:
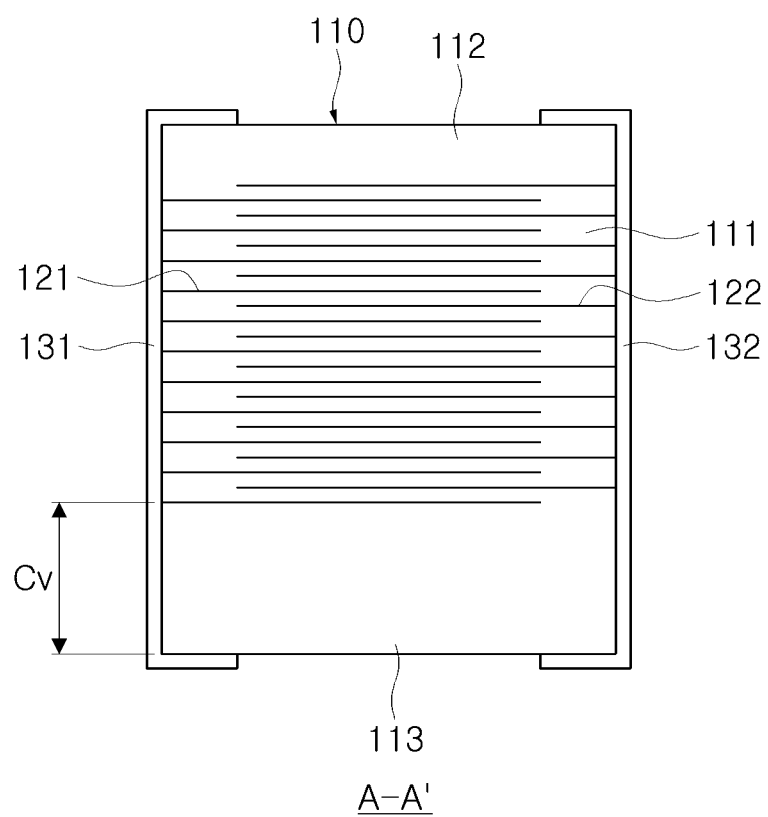
FIG. 5 is a side cross-sectional view schematically showing a multilayer ceramic capacitor according to another embodiment of the present invention.

FIG. 5 is a side cross-sectional view schematically showing a multilayer ceramic capacitor according to another embodiment of the present invention.

Here, since a structure in which the first and second internal electrodes 121 and 122 and the first and second external electrodes 131 and 132 are formed is similar to the structure as previously described in the embodiment of the present invention, a specific description thereof will be omitted in order to avoid repeated explanations.

In this case, in the cross-section of the multilayer ceramic capacitor 100 in the width-thickness direction, a portion in which the internal electrodes are disposed to form capacitance may be defined as an active layer, and portions except for the active layer may be defined as margin parts.

Among the margin parts, upper and lower margin parts of the active layer in the thickness direction may be defined as an upper cover layer 112 and a lower cover layer 113, respectively.

The upper cover layer 112 and lower cover layer 113 may be formed by sintering ceramic sheets in a similar manner to that of the dielectric layer 111 formed between the first and second internal electrodes 121 and 122.

In addition, the plurality of dielectric layers including the upper cover layer 112 and lower cover layer 113 may be in a sintered state, and adjacent dielectric layers may be integrated such that boundaries thereof therebetween may not be discerned without using a scanning electron microscope (SEM).

Referring to FIG. 5, the lower cover layer 113 may have a thickness greater than that of the upper cover layer 112 in the present embodiment.

That is, the lower cover layer 113 may have the thickness greater than that of the upper cover layer 112 by increasing the number of the ceramic sheets stacked in the lower cover layer 113 as compared to the upper cover layer 112.

The lower cover layer 113 has the thickness greater than that of the upper cover layer 112 as described above, acoustic noise may be effectively decreased.

As set forth above, according to the embodiment of the present invention, the ratio of the length to the width of the ceramic body is defined, such that the acoustic noise and the ESL occurring when the vibrations generated in the multilayer ceramic capacitor due to the piezoelectric phenomenon are transmitted to the circuit board through the external electrode and the solder can be decreased.

With the product manufactured according to the embodiment of the present invention, the high frequency property thereof may be prevented from being deteriorated, such that at the time of mounting the product on the circuit board, the acoustic noise and the ripple voltage may be effectively removed.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
    a ceramic body including a plurality of dielectric layers and having first and second main surfaces facing each other in a thickness direction, third and fourth end surfaces facing each other in a length direction, and fifth and sixth side surfaces facing each other in a width direction;
    a plurality of first and second internal electrodes disposed in the ceramic body to be alternately exposed through the fifth and sixth side surfaces, having the dielectric layers therebetween; and
    first and second external electrodes formed on the surfaces of the ceramic body in the width and thickness directions and electrically connected to the first and second internal electrodes,
    wherein $1.39 \leq L/W \leq 2.12$, where L is a length of the ceramic body and W is a width of the ceramic body, and $8.05 \leq B/Cv \leq 10.56$, where B is a length of the first or second external electrode and Cv is a thickness of a lower margin part of the ceramic body.

2. The multilayer ceramic capacitor of claim 1, wherein the length of each of the first and second external electrodes is smaller than the length of the ceramic body.

3. A multilayer ceramic capacitor comprising:
    a ceramic body including a plurality of dielectric layers and having first and second main surfaces facing each other in a thickness direction, third and fourth end surfaces facing each other in a length direction, and fifth and sixth side surfaces facing each other in a width direction;
    a plurality of first and second internal electrodes disposed in the ceramic body to be alternately exposed through the fifth and sixth side surfaces, having the dielectric layers therebetween; and
    first and second external electrodes formed on the surfaces of the ceramic body in the width and thickness directions and electrically connected to the first and second internal electrodes,
    wherein $1.39 \leq L/W \leq 2.12$, where Lisa length of the ceramic body and W is a width of the ceramic body, and the ceramic body further includes an upper cover layer and a lower cover layer formed in an upper portion and a lower portion of an active layer having the first and second internal electrodes disposed therein, respectively.

4. The multilayer ceramic capacitor of claim 3, wherein the lower cover layer has a thickness greater than that of the upper cover layer.

5. A manufacturing method of a multilayer ceramic capacitor, the manufacturing method comprising the steps of:
    preparing a stacked body by stacking and pressing a plurality of ceramic sheets having first and second internal electrodes formed therein to face each other, with the ceramic sheets interposed therebetween, the first and second internal electrodes being formed so as to be alternately exposed in a width direction;
    preparing a ceramic body by cutting the stacked body into portions, each portion corresponding to one capacitor, and firing the portions to form ceramic bodies each having first and second main surfaces facing each other in a thickness direction, third and fourth end surfaces facing each other in a length direction, and fifth and sixth side surfaces facing each other in the width direction to which the first and second internal electrodes are exposed, respectively; and
    forming first and second external electrodes formed on the surfaces of the ceramic body in the width and thickness directions to be electrically connected to the first and second internal electrodes,
    wherein $1.39 \leq L/W \leq 2.12$, where L is a length of the ceramic body and W is a width of the ceramic body, and in the step of forming the first and second external electrodes, $8.05 \leq B/Cv \leq 10.56$, where B is a length of the first or second external electrode and Cv is a thickness of a lower margin part of the ceramic body.

6. The manufacturing method of claim 5, wherein in the forming of the first and second external electrodes, the length of each of the first and second external electrodes is smaller than the length of the ceramic body.

7. A manufacturing method of a multilayer ceramic capacitor, the manufacturing method comprising the steps of:
    preparing a stacked body by stacking and pressing a plurality of ceramic sheets having first and second internal electrodes formed therein to face each other, with the ceramic sheets interposed therebetween, the first and second internal electrodes being formed so as to be alternately exposed in a width direction;
    preparing a ceramic body by cutting the stacked body into portions, each portion corresponding to one capacitor, and firing the portions to form ceramic bodies each having first and second main surfaces facing each other in a thickness direction, third and fourth end surfaces facing each other in a length direction, and fifth and sixth side surfaces facing each other in the width direction to which the first and second internal electrodes are exposed, respectively; and
    forming first and second external electrodes formed on the surfaces of the ceramic body in the width and thickness directions to be electrically connected to the first and second internal electrodes,
    wherein $1.39 \leq L/W \leq 2.12$, where L is a length of the ceramic body and W is a width of the ceramic body, and in the step of preparing the stacked body, the stacked body has an upper cover layer and a lower cover layer by stacking the plurality of ceramic sheets having no internal electrodes formed therein on an upper portion and a lower portion of the plurality of ceramic sheets having the first and second internal electrodes disposed therein, respectively.

8. The manufacturing method of claim 7, wherein in the preparing of the stacked body, the lower cover layer has a thickness greater than that of the upper cover layer.

9. A mounting circuit board of a multilayer ceramic capacitor, the mounting circuit board comprising:
    a circuit board having first and second electrode pads disposed thereon; and
    at least one multilayer ceramic capacitor mounted on the circuit board,
    wherein the multilayer ceramic capacitor includes: a ceramic body including a plurality of dielectric layers and having first and second main surfaces facing each other in a thickness direction, third and fourth end surfaces facing each other in a length direction, and fifth and sixth side surfaces facing each other in a width direction; a plurality of first and second internal electrodes disposed in the ceramic body be alternately exposed through the fifth and sixth side surfaces, having the dielectric layers interposed therebetween; and first and second external electrodes formed on the surfaces of the ceramic body in the width and thickness, electrically connected to the first and second internal electrodes, and connected to the first and second electrode pads, and $1.39 \leq L/W \leq 2.12$, where L is a length of the ceramic body and W is a width of the ceramic body, wherein $8.05 \leq B/Cv \leq 10.56$, where, in the multilayer ceramic capacitor, B is a length of the first or second external electrode and Cv is a thickness of a lower margin part of the ceramic body.

10. The mounting circuit board of claim 9, wherein in the multilayer ceramic capacitor, the length of each of the first and second external electrodes is smaller than the length of the ceramic body.

11. A mounting circuit board of a multilayer ceramic capacitor, the mounting circuit board comprising:
 a circuit board having first and second electrode pads disposed thereon; and
 at least one multilayer ceramic capacitor mounted on the circuit board,
 wherein the multilayer ceramic capacitor includes: a ceramic body including a plurality of dielectric layers and having first and second main surfaces facing each other in a thickness direction, third and fourth end surfaces facing each other in a length direction, and fifth and sixth side surfaces facing each other in a width direction; a plurality of first and second internal electrodes disposed in the ceramic body be alternately exposed through the fifth and sixth side surfaces, having the dielectric layers interposed therebetween; and
 first and second external electrodes formed on the surfaces of the ceramic body in the width and thickness, electrically connected to the first and second internal electrodes, and connected to the first and second electrode pads, and $1.39 \leq L/W \leq 2.12$, where L is a length of the ceramic body and W is a width of the ceramic body,
 wherein in the multilayer ceramic capacitor, the ceramic body further includes an upper cover layer and a lower cover layer formed on an upper portion and a lower portion of an active layer having the first and second internal electrodes disposed therein, respectively.

12. The mounting circuit board of claim 11, wherein the lower cover layer has a thickness greater than that of the upper cover layer.

* * * * *